Aug. 5, 1969  C. F. DE PRISCO  3,460,025
HIGH FREQUENCY, HIGH POWER SOURCE SOLID STATE INVERTER
Filed Jan. 14, 1966
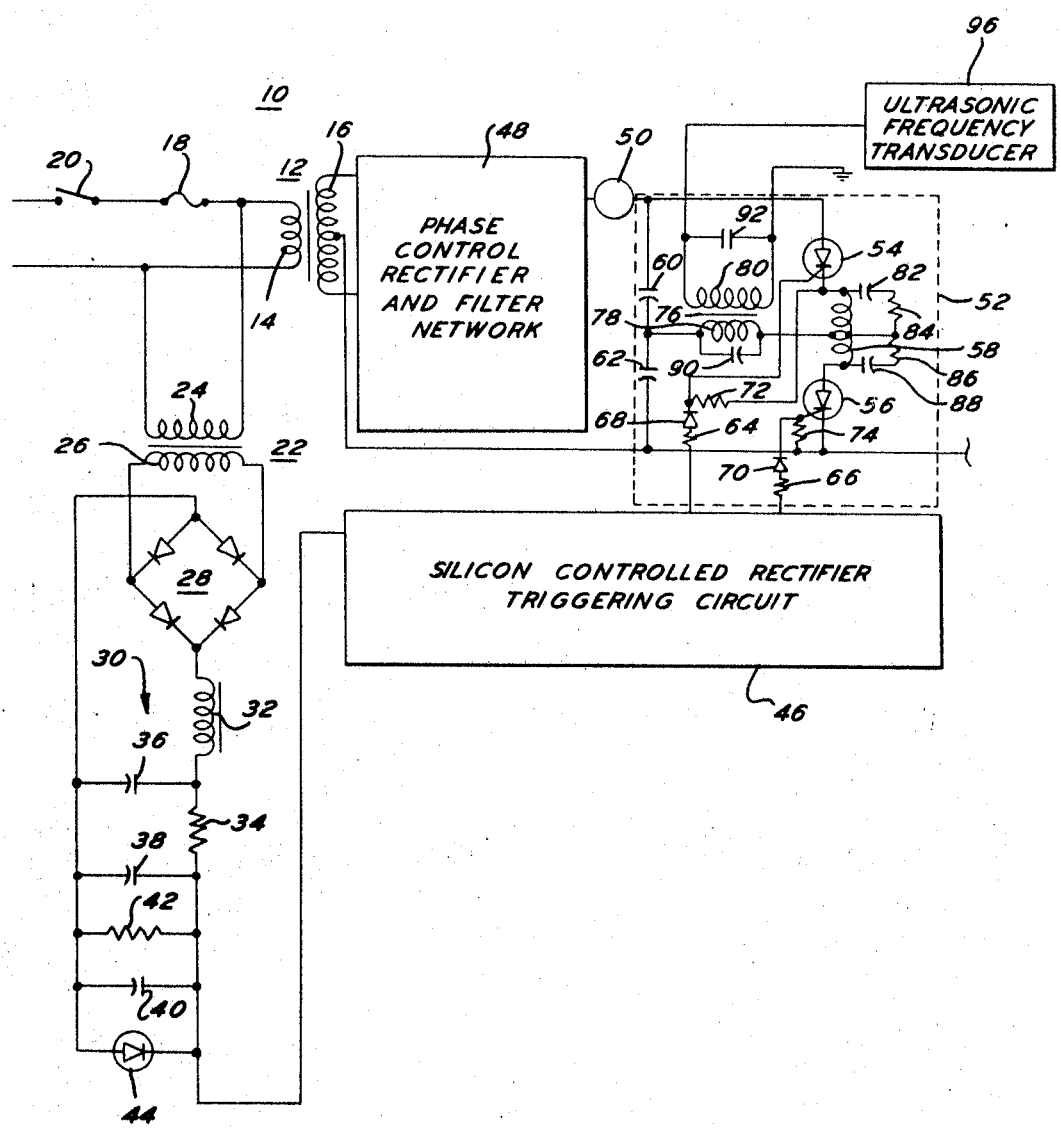
INVENTOR
CARMINE F. DePRISCO
BY *Seidel & Gonda*
ATTORNEYS.

3,460,025
HIGH FREQUENCY, HIGH POWER SOURCE SOLID
STATE INVERTER
Carmine F. De Prisco, Glen Mills, Pa., assignor to Aeroprojects Incorporated, West Chester, Pa., a corporation of Pennsylvania
Filed Jan. 14, 1966, Ser. No. 520,726
Int. Cl. H02m 7/44, 7/68
U.S. Cl. 321—43                                    6 Claims

ABSTRACT OF THE DISCLOSURE

A solid state power supply for a high frequency, high power, variable impedance load including a Class A series inverter circuit including a first and second control rectifiers, a gating circuit for alternately triggering the rectifiers, a direct current power source for said circuit, an impedance matching transformer connected to the output of the inverter circuit and to a load, a capacitor connected in the primary and a capacitor connected across the secondary of the transformer for maintaining the turn-off time long enough to restore blocking to the rectifiers.

---

This invention relates to a solid state power supply. More particularly, this invention relates to electrical power sources for use with ultrasonic devices, and to a solid state power source for use with an electrically-actuated ultrasonic transducer.

Ultrasonic generators or ultrasonic power sources (sometimes called oscillators, although they have usually comprised amplifiers in addition to oscillators) are essentially frequency-converters. Thus, they are devices for automatically converting electrical power from the power supply at line frequency to suitably amplified power at the desired ultrasonic frequency for use with an ultrasonic transducer. The transducer converts the electrical energy into mechanical vibration at that frequency, which is preferably the resonant frequency of the transducer. Vacuum-tube circuits (and more recently transistor circuits) have been used for the purpose. The present invention is of the solid state type but does not involve transistors per se. It is an improved power source solving problems which hitherto have not been solved.

Heretofore, a large portion of the cost of typical electrically-actuated ultrasonic devices have been occasioned by power source complexities. The use of transistors instead of vacuum tubes has offered potential for elimination of intermediate stages, smaller and more compact size, lighter weight, less power consumption for equivalent output, reduction of ambient heating, and rugged construction. However, transistor-type power sources are not yet able to produce as large power outputs as vacuum tubes with equivalent circiutry. Moreover, they have been reliable only for applications of the constant-load type (such as the relatively lower power ultrasonic cleaning), principally because they are less tolerant than tube circuits of short or open circuit conditions.

Thus, handbook transistor circuits have been primarily suitable for lower power applications of ultrasonics, and those wherein there are no great load variations during the power application interval. However, in certain ultrasonic applications (of which ultrasonic welding is one), it has been found that instantaneous variations in transducer circuit constants may occur during ultrasonic activation (i.e., from a no-weld condition through a varying load to the welded condition). Frequency and power stability are ordinarily essential to reproducible ultrasonic operation, and provision for such stability is all the more important in a non-constant load application. It is with such applications that the present invention is particularly effective, although it may also be used with benefit in the low power or continuing load situations as well.

Until recently, the power transistor has been unable to oscillate or amplify with adequate efficientcy for purposes of the present invention. Now, however, the Silicon Controlled Rectifier (SCR) is available, including some improved versions. It is a semiconductor, a rectifier, a latching static switch capable of operating in microseconds, and a sensitive power amplifier. It has far greater voltage and current power capabilities under both continuous and surge conditions. A basic SCR is a disk of four alternate layers of P and N type silicon, the layers and junctions between them formed by precision gaseous diffusion and alloying techniques. It has unique electrical characteristics, as aforesaid, and it is used herein in a novel manner.

The present invention incorporates a modified Class A series inverter circuit. While the Class A inverter circuit is well known in the art as being capable of high frequency operation, such circuits depend upon a predetermined fixed resonant circuit for commutating controlled rectifiers. It has been found that, if during operation there are variations (instantaneous or otherwise) in circuit constants (as there may be during the ultrasonic weld pulse interval, for example), such changes may be reflected back into the inverter circuit and change its resonant frequency. Such changes ultimately cause misfiring in the controlled rectifiers, thereby affecting the output frequency and the operational stability and efficiency of the ultrasonic device. The present invention avoids malfunction essentially by addition of parallel capacitors across the load, with a constant voltage source (rather than a constant current source) being presented to the load with improved regulation.

It therefore is the general object of this invention to provide a novel power supply.

It is another object of the present invention to provide a novel solid state power supply.

It is a further object of the present invention to provide a novel solid state power supply capable of delivering high frequency energy to a load of varying impedance.

It is still another object of the present invention to provide a novel power supply incorporating an inverter circuit capable of delivering high frequency energy to a load of varying impedance.

It is yet another object of the present invention to provide a novel solid state power supply for high powered ultrasonic apparatus.

Other objects of the present invention will appear hereinafter.

For the purpose of illustrating the invention, there is shown in the drawings a form which is presently preferred; it being understood, however, that this invention is not limited to the precise arrangements and instrumentalities.

The drawing illustrates a schematic diagram of the power supply in accordance with the present invention.

The illustrated and described embodiment (with the values given) is suitable for a maximum permissible power output of 1500 watts at a nominal frequency of 15,000 cycles per second, or a maximum permissible power output of 1000 watts at a nominal frequency of 25,000 cycles per second. While the invention is described in this fashion, it will be appreciated that (with value changes such as are within the skill of the art), the invention may be used at other power levels and frequencies, if silicon controlled rectifiers or other solid state devices having appropriate characteristics are available.

Note that a power source having a maximum permissible output (RMS power into a resistive load, and not peak power which may be higher) such as 1000 or 1500 watts may be used for lower power output. Similarly, banks of circuits in accordance with the present invention could be used for devices and applications necessitating higher power.

While this embodiment is described in conjunction with a magnetostrictive transducer, other transducers may be used and a suitable electrostrictive ceramic transducer (such as one comprising lead zirconate titanate) is presently preferred. Thus, the ceramic's conversion efficiency is usually higher, and the electrical interrelationships are normally cleaner. The invention is applicable to both types of transducers and this is an unusual advantage.

Referring now to the drawing in detail, there is shown a solid state power source designated generally as 10.

A transformer 12 (with primary 14 and secondary 16) is adapted to have its primary 14 connected to a source of alternating current, such as would be provided by a commercial power supply. One side of the primary 14 is adapted to be connected to the power supply through a fuse 18 and circuit on-off switch 20. A second transformer 22 (having a primary 24 and a secondary 26) is connected in parallel with the primary 14. The transformer 22 has its secondary 26 connected to a full wave bridge rectifier 28 which is connected to a filter circuit 30. The filter 30 comprises an inductance 32 and resistance 34 connected to one side of the rectifier 28; a capacitor 36 is connected intermediate the inductor 32 and the resistor 34 and to the opposite side of the rectifier 28. The filter 30 contains additional capacitors 38 and 40 as well as resistor 42 connected to the opposite side of the rectifier 28 and to the resistor 34. A Zener diode 44 is connected in parallel with the capacitors 38 and 40 and resistor 42.

The manner of operation of the full wave bridge rectifier 28 and filter 30 is well known in the art and therefore need not be described in further detail. As shown, the output rectifier 28 and filter 30 is applied to a silicon controlled rectifier triggering or gating circuit designated by the block diagram 46. The purpose of the triggering circuit 46 will be described in more detail below. The function and operation of such triggering circuits is well known to the art and therefore need not be described in detail. Publications in which the principles of such circuits may be found are "Semiconductor Controlled Rectifiers, Principles and Applications of p-n-p-n Devices," Gentry, Prentice-Hall, Inc., 1964; "Principles of Inverter Circuits," B. D. Bedford, John Wiley & Sons, 1964; and "The General Electric SCR Manual," Third Edition, 1965.

The secondary 16 of the transformer 12 is connected to a phase control rectifier and filter network 48 schematically illustrated by a block diagram. The rectifier and network 48 is well known in the art and need not be described in detail. The publications cited above are examples of publications disclosing it.

The output of rectifier and filter 48 is applied through a circuit breaker 50 to the anodes of a first silicon controlled rectifier 54 and a second silicon controlled rectifier 56.

The inverter circuit 52 is based upon the type generally known as a Class A series inverter. As shown, the circuit 52 includes SCR 54 and SCR 56. An inductor 58 is connected between the cathode of SCR 54 and the anode of SCR 56. A capacitor 60 is connected to the anode of SCR 54 and to a second capacitor 62 which in turn is connected to the cathode of SCR 56.

As shown, the triggering or gating for SCR's 54 and 56 is derived from the circuit 46 and applied through resistors 64 and 66 and diodes 68 and 70. Resistors 72 and 74 complete the connection of the circuit 46 to the cathodes of SCR's 54 and 56.

The operation of the inverter circuit as thus far described is known. Thus, when SCR 54 is triggered (at gate) a positive voltage appears at the righthand side of winding 78, and a half-cycle sine wave current pulse results (due to the resonant frequency of the inductive and capacitive circuit elements). When the current through the load tries to reverse (due to series resonant action), SCR 54 becomes reversed biased and turns off. At this point, SCR 56 is triggered and a positive pulse appears at the lefthand side of winding 78, completing the full sine wave.

By properly selecting the frequency of the circuit 46 and the resonant frequency of inverter circuit 52, output frequencies of 15,000 to 25,000 cycles per second can be obtained for application to the load through matching transformer 76.

When operating at the frequencies described above, a large amount of oscillations appear across the SCR's during their turnoff time, so that the SCR's 54 and 56 conduct at random. A suppressor circuit has been coupled to the inductor 58, the suppressor circuit serving to dampen the oscillations during the SCR turn-off time, thereby preventing unwanted random firing.

In the embodiment shown, the suppressor circuit comprises a capacitor 82 connected to one end of the inductor 58 and to a resistor 84. The resistor 84 is connected at its other end to a center tap on the inductor 58 and to a second resistor 86. The resistor 86 is connected to the capacitor 88 which in turn is connected to the opposite end of inductor 58.

In addition, it has been found that when a transducer of either the magnetostrictive or electrostrictive type is coupled to the load matching transformer 76, the circuit breaker 50 trips. This may occur at any time during the weld pulse, or when the secondary of transformer 80 is open circuited. Thus, both SCR's may be in the conducting state rather than the proper alternating conductive-nonconductive mode, so that one of the SCR's may not reach its blocking state before the second SCR is fired.

To prevent the two SCR's from misfiring or conducting simultaneously, a capacitor 90 is coupled across the primary 78. Note that the size of this capacitor 90 is important, as the circut Q is affected with resultant change in circuit turn-off time. To optimize performance (i.e., minimize misfiring), it is desirable to adjust the tank resonant frequency to be higher than the gating or triggering frequency. If the difference is too great, notches may appear in the output waveform with resultant power loss. However, SCR turn-off time condition is improved (lengthened).

In order to further ensure efficient operation, a shunt capacitor 92 is provided across the secondary 80. It appears to assist in handling output variations of the secondary 80 of transformer 76, such as may occur particularly under non-constant load conditions.

Thus, the combination of capacitors 90 and 92 prevents the turnoff time from becoming too short under conditions of variation (especially instantaneous variation) in circuit constants during activation of the ultrasonic device.

The underlying basis by which the elements 76, 78, 80, 90 and 92 are able to prevent faulting of the SCR's, while at the same time providing a substantially undistorted wave form, is not fully understood. However, it is known that they enable efficient and reproducible operation under varying conditions such as is not possible without them.

Although the principles described above are capable of other applications, as would be obvious to those skilled in the art, in one particular operative embodiment of the invention shown in the drawings, where it is desired to obtain a 1200 to 1500 watt output at 7.5 amperes and 215 volts at approximately 15,000 cycles per second and the input voltage to the inverter circuit 52 is 15 amperes at 120 volts direct current, the following components may be employed. As aforesaid, the values are given only for purpose of illustration and are not to be construed as being limiting.

In this case, the output transducer 96 is of the magnetostrictive type and is used to operate an ultrasonic welder (see, for example, U.S. Patent No. 2,946,119 issued July 26, 1960).

Silicon controlled rectifiers 54 and 56—ZJ255D, manufactured by General Electric Company
Diodes 68 and 70—IN540, manufactured by General Electric Company
Inductor 58—76 microhenries, center tapped
Transformer 76, impedance matching—primary 2 ohms, secondary 24 ohms
Capacitors 60 and 62—1.0 mfd., 1000 volts direct current
Capacitors 82 and 86—0.1 mfd., 1000 volts direct current
Capacitors 90 and 92—0.2 mfd., 500 volts film capacitors
Resistors 64 and 66—20 ohms, ½ watt
Resistors 72 and 74—51 ohms, ½ watt
Resistors 84 and 86—100 ohms, 50 watts.

Transducer 96, as aforesaid, is of the magnetostrictive type in this embodiment and may be of conventional construction comprising, for example, a half-wavelength long laminated core of nickel, nickel-iron alloy, or other magnetostrictive material, properly dimensioned to insure axial resonance with the frequency of alternating current applied thereto by its excitation coil (not shown) so as to cause it to increase or decrease in length according to its coefficient of magnetostriction. The detailed construction of a suitable magnetostrictive transducer is well known to those skilled in the art and does not form a part of the present invention, and accordingly no description of its construction will be made herein.

Transducer 96 is also provided with a conventional polarizing coil (not shown). The desirability of magnetically polarizing the magnetostrictive transducer 96 by means of such a polarizing coil, in order for the metal laminations in said transducer 96 to efficiently convert the applied energy from the excitation coil into elastic vibratory energy, is also readily understood by those skilled in the art. Low voltage direct current can be supplied to said polarizing coil by battery, rectifier, or other means well known to the art.

As is well known to the art and as aforesaid, the electrical frequency of the alternating current power supply (such as 60 cycles per second) is changed to match the mechanical or elastic vibratory frequency of the transducer 96 (15,000 cycles per second being its nominal resonant frequency in this example, as above indicated). If the power source of the present invention were to be used for up to 1000 watts at a 25 kc. frequency, transducer 96 would be dimensioned to operate at 25 kc., as will be understood by those skilled in the art.

The present invention may be embodied in other specific forms without departing from the spirit or essential attributes thereof and, accordingly, reference should be made to the appended claims, rather than to the foregoing specification as indicating the scope of the invention.

I claim:

1. In a Class A series inverter circuit including a commutating inductor connected intermediate a first and second controlled rectifier, a transformer connected intermediate the end of said inductor and intermediate two commutating capacitors, a first capacitor connected across the primary of said load matching transformer and capacitive means connected in the secondary of said transformer, and a suppressor circuit connected to said inductor, said suppressor circuit comprising a first series connected resistor and capacitor, said first resistor and capacitor being connected between one end of said inductor and the transformer connection to the inductor, and a second series connected resistor and capacitor, said second resistor and capacitor being connected between the other end of said inductor and said transformer connection.

2. A power supply for a variable impedance load comprising a Class A series inverter circuit, said inverter circuit including a first and second controlled rectifier, gating means for said controlled rectifiers, an inductor connected between said rectifiers, phase control means for connecting said inverter circuit to a source of power, an impedance matching transformer connected to the output of said inverter circuit, a first capacitor connected across the primary of said impedance matching transformer, a second capacitor connected across the secondary of said impedance matching transformer.

3. A power supply for a variable impedance load comprising a Class A series inverter circuit, said inverter circuit including a first and second controlled rectifier, gating means for said controlled rectifiers, an inductor connected between said rectifiers, phase control means for connecting said inverter circuit to a source of electrical power, an impedance matching transformer connected to the output of said inverter circuit, a first capacitor connected across the primary of said impedance matching transformer, a second capacitor connected across the secondary of said impedance matching transformer, a suppressor circuit connected to said inductor, said suppressor circuit comprising a first series connected resistor and capacitor, said first resistor and capacitor being connected between one end of said inductor and the transformer connection to the inductor, and a second series connected resistor and capacitor, said second resistor and capacitor being connected between the other end of said inductor and said transformer connection.

4. A power supply for an ultrasonic frequency variable impedance load comprising a Class A series inverter circuit, said inverter circuit including first and second controlled rectifiers, gating means for said rectifiers, a phase control means for connecting said inverter circuit to a source of electrical power, a transformer connected to the output of said inverter circuit, and capacitive means connected in the primary and secondary of said transformer for maintaining the turn-off time of said rectifier long enough to restore a blocking condition.

5. A power supply in accordance with claim 4 wherein said impedance means includes a capacitor connected across the secondary of said transformer.

6. In a Class A series inverter circuit for operation at ultrasonic frequencies and connection to a variable impedance load including a commutating inductor connected intermediate a first and second controlled rectifier, a load matching transformer connected intermediate the ends of said inductor and intermediate the commutating capacitors, a capacitive means connected to the primary and secondary of said load matching transformer for maintaining the apparent load in a uniform impedance.

References Cited

UNITED STATES PATENTS

| | | | |
|---|---|---|---|
| 3,008,081 | 11/1961 | Duinker | 321—9 XR |
| 3,047,789 | 7/1962 | Lowry | 321—45 XR |
| 3,119,058 | 1/1964 | Genuit | 321—45 |
| 3,229,226 | 1/1966 | Wilting | 321—45 XR |
| 3,263,148 | 7/1966 | Biringer | 321—69 XR |
| 3,263,152 | 7/1966 | Walker | 321—45 |
| 3,295,045 | 12/1966 | Domizi | 321—7 |
| 3,303,406 | 2/1967 | Bedford | 321—44 |
| 3,319,147 | 5/1967 | Mapham | 321—45 XR |
| 3,334,291 | 8/1967 | Hehenkamp | 321—44 |

JOHN F. COUCH, Primary Examiner

W. M. SHOOP, Jr., Assistant Examiner

U.S. Cl. X.R.

219—131; 321—45